United States Patent [19]

Moedritzer

[11] 3,855,352

[45] Dec. 17, 1974

[54] PHOSPHORUS-CONTAINING POLYMERS

[75] Inventor: Kurt Moedritzer, Webster Groves, Mo.

[73] Assignee: Monsanto Company, St. Louis, Mo.

[22] Filed: July 17, 1972

[21] Appl. No.: 272,239

[52] U.S. Cl.............. 260/873, 260/2 P, 260/45.7 P, 260/85.5 R, 260/87.5 E, 260/857 UN, 260/874, 260/888, 260/896, 260/898, 260/899, 260/DIG. 24
[51] Int. Cl............................................. C08g 39/10
[58] Field of Search............. 260/873, 2 P, DIG. 24, 260/45.7 P, 75 P, 606.5 P, 80 PS, 873 UN, 874, 888, 896, 899, 898

[56] References Cited

UNITED STATES PATENTS

| 3,681,281 | 8/1972 | Juelke et al.......................... 260/873 |
| 3,341,625 | 9/1967 | Gillham.............................. 260/887 |
| 3,629,365 | 12/1972 | Gardner.............................. 260/857 |

Primary Examiner—Melvin Goldstein
Assistant Examiner—T. Pertilla

[57] ABSTRACT

Compositions of matter based upon an organic polymer and a phospholene oxide polymer. The compositions have flame retardant properties.

6 Claims, No Drawings

PHOSPHORUS-CONTAINING POLYMERS

The present patent application refers to subject matter also set forth in co-pending patent application Ser. No. 272,249, filed July 17, 1972.

The present invention relates to compositions of matter which are based upon organic polymers together with phosphorus-containing compositions and the use of these combinations as flame retardant compositions. The phosphorus-containing compositions may be used as additives with organic polymers, or as copolymers with olefinic and other monomers to yield commercial high molecular weight polymers. The resultant products containing the said phosphorus polymers as additives or as comonomers can be formed into fibers, films and other shaped articles having greatly improved flame-retardant properties.

The invention is based on the use of products from the homo- or copolymerization of phospholene oxides as fire retardants. The phospholene oxides may be obtained by reacting alkyl or arylphosphonous dihalides, such as $CH_3PCl_2$ or $C_6H_5PBr_2$, with a conjugated 1,3-diene, such as butadiene, dimethylbutadiene or isoprene, (as the various isomeric forms) according to equation (A), in which X is a halogen (F, Cl, Br, or I), which illustrates typical structures, as defined below. The diene may also be halo-substituted e.g. chloroprene.

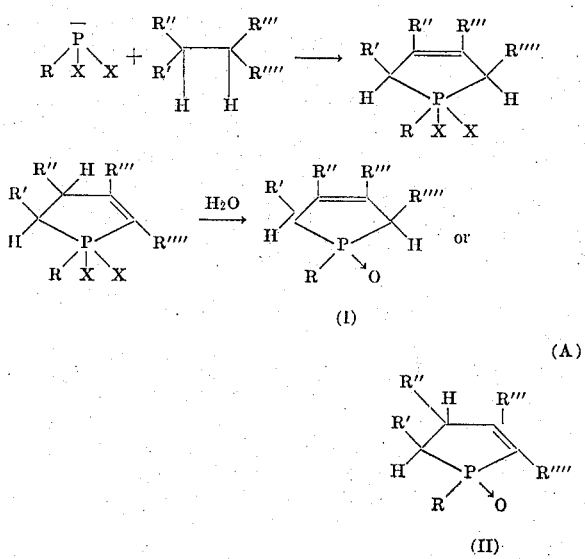

(A)

The resulting phospholene oxides (whether as structure I or II depends on R and X) may be polymerized using anions such as t—BuMgCl, lithium alkyls, sodium naphthalene, aluminum alkyls and other catalysts e.g. $BF_3$ or $(t—BuO)_2$ to give polymers having units of the general structure shown below (R is hydrocarbyl such as alkyl, aryl, aralkyl and alkylaryl having from 1 to 20 carbons atoms, R', R'', R''', R'''' are hydrogen or hydrocarbyl as above; R can also be a halogenated aromatic group such as chlorophenyl or bromophenyl). The polymers are characterized by the repeating units,

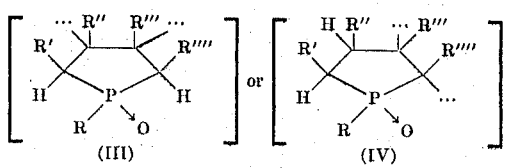

and mixtures thereof, or a typical structure

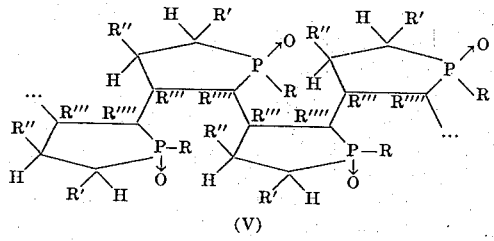

The phospholene oxide monomer can also be crosslinked to a polymeric form by conducting the polymerization in the presence of a crosslinking agent such as divinylbenzene, divinylphenylphosphine oxide and others.

For $R = C_6H_5$ and $R' = R'' = R''' = R'''' = H$ (derived from butadiene) a white, water-insoluble polymer is obtained, which softens at ca. 260°–270°C and which is stable up to 300°C. This material is found to have a molecular weight distribution ranging from 200 to 1,000,000. The phosphorus content of this polymer is about 16% (calc'd. 17.6%). When applied as 10% by weight additive to polyester or nylon, the polymer raises the oxygen index (defined below) of polyethylene terephthalate or nylon polymer from 20 to 25.

In general, the preferred proportions of the phospholene oxide components incorporated in from 1% to 25% by weight relative to the total composition. Indicated compositions have the proportions regualted in accordance with the desired properties of the product.

For $R = CH_3$ and $R' = R'' = R''' = R'''' = H$ (derived from butadiene) the resulting product has a phosphorus content of ca. 27%. When applied as 10% by weight as an additive, this polymer raises the oxygen index from 20 to 28–29.

For $R = C_2H_5$ and $R' = R'' = R'''' = H$ and $R''' = CH_3$ (derived from isoprene) the resulting product has a phosphorus content of ca. 23.5%. When applied as 10% by weight as an additive, this polymer raises the oxygen index from 20 to about 27–28.

The present invention is based upon the incorporation of phospholene oxide polymers with organic polymers, either by physical addition or by copolymerization of a mixture of the respective monomers. Consequently, the reference to the phospholene oxide component as being incorporated with the organic component embraces the use of phospholene oxide polymers as additives in organic polymers, and as polymerizable monomers to be copolymerized with other monomers to form improved copolymers. Thus, the broad class of organic polymers may be employed such as nylon, polyesters, acrylics, etc. Examples of nylon, e.g. polyamide polymers include nylon 6,6 (polyhexamethylene adipamide), poly-epsilon-caproamides, polyhexamethylene sebacamide. Examples of polyesters include polyethylene terephthalate. The invention also includes both copolymers and additives of the phospholene oxide with olefinic polymers such as acrylonitrile, styrene, butadiene-styrene, vinyl chloride, vinylidene chloride, vinyl acetate and isobutylene. Such polymers have the $CH_2=CH-$ or $CH_2=C=$group suitable for addition polymerization.

When a copolymer product is desired, any proportion of the phospholene oxide monomer, such as (I) or (II) above may be added to the desired comonomer, e.g., acrylonitrile, vinyl chloride, styrene, etc., and the combination polymerized by the use of the above desired initiators. When emphasizing flame-retardance properties of the copolymer product, a preferred range of phosphorus monomer is from 1 to 25% by weight relative to the toal copolymer composition.

The following examples illustrate specific embodiments of the invention.

EXAMPLE 1

A quantity of 2 g of cupric stearate, 228 g (1.95 mole) of methylphosphonous dichloride and 324 g (6.0 mole) of butadiene are charged into a glass-lined pressure vessel. The mixture is stirred at room temperature for 3 weeks. After this period, the excess butadiene is vented and unreacted methylphosphonous dichloride removed in a vacuum. The remaining solid is hydrolyzed by adding it to ice-cooled water. After neutralization of the aqueous solution to pH7, the 1-methyl-3-phospholene-1-oxide is extracted with chloroform and the resulting chloroform solution is dried and is distilled. The phospholene oxide, distilling at 75°–80°C at 1 mm pressure is obtained in a quantity of 215 g representing a yield of 95%.

Homopolymerization of the above phospholene oxide is effected in the following manner. A quantity of 2.7 g of the freshly distilled phospholene oxide monomer under exclusion of moisture is placed in a Schlenk tube in an atmosphere of dry nitrogen and 40 ml of dry, freshly distilled (over LiAlH$_4$) tetrahydrofuran is added. The solution is stirred at room temperature and catalytic amounts of a 2.3 molar solution of t-butylmagnesium chloride in tetrahydrofuran are added. Initially, the solution turns brown, and within a short time a white precipitate begins to form. The solution becomes rather thick and the temperature within the tube rises to 50°–60°C. The mixture is stirred for 1 hour, filtered, washed with dry tetrahydrofuran and dried in a vacuum oven at 60 °C over night, yield 2.6 g or 96%.

The white solid polymer is analyzed to give 50.2% C, 8.0% H and 24.3% P; calculated for R = CH$_3$ and R' = R'' = R''' = R'''' = H in Structure III or IV above: 51.7% C, 7.8% H and 26.7% P. Gel permeation chromatography indicates a molecular weight range from 1,000 to 1,000,000. The product melts in the range from 170°–220°C and under a nitrogen atmosphere remains stable at temperatures in excess of 300°C for extended periods of time. Thermogravimetric analysis of a sample of the polymer (in nitrogen) indicates onset of thermal decomposition at 400°C. The ultimate polymer may have structure III or IV or mixtures thereof (the structure IV is equivalent to V). The monomer has structure (I), although some catalysts prior to polymerization may isomerize (I) to (II) which latter isomer upon polymerization will give structure (V).

The phospholene oxide polymer when used as an additive is applied as a solid powder into the molten organic polymer, e.g. nylon, or is calendered or milled as a solid or a solution into solid particles or a melt of the organic polymer, e.g., a polyester.

The resultant phosphorus-containing polymer composition when tested as a fire retardant additive, for example, at 10% by weight of the above polymer mixture (equivalent to 2.5 wt. % P in the total composition), in polyethylene terephthalate or nylon 6,6 causes the ASTM 2D-2863 oxygen index of each sample to change from about 20 to 29—29.

Oxygen Index Test (ASTM 2D-2863) A 2 inch × 6 inch sheet of desired thickness is mounted in a U-shaped frame surrounded by a chimney. The atmosphere in the chimney is a controlled mixture of nitrogen and oxygen. The ratio of oxygen to nitrogen is varied so that a sample ignited on the top will sustain combustion. The oxygen index number is expressed by:

Oxygen Index = $[O_2]/[O_2] + [N_2] \times 100$ where $[O_2]$ is the volume fraction of oxygen and $[N_2]$ is the volume fraction of nitrogen.

The oxygen index number is defined as that oxygen and nitrogen mixture that will last sustain combustion, when varied as described.

EXAMPLE 2

A quantity of 1 g of cupric stearate, 179g (1 mole) of freshly distilled phenylphosphonous dichloride and 162 g (3.0 mole) of butadiene are charged into a glass reactor. The mixture is stirred at room temperature for 4 weeks. The reaction product is worked up as described in Example 1 and 110 g (0.62 mole) of 1-phenyl-2-phospholene-1-oxide is obtained, yield 62%, by.p. 165°C at 1 mm pressure. The phospholene oxide solidifies on standing, and gives a crystalline solid melting at 75°C.

Homopolymerization of this material is effected by the procedure of Example 1. A quantity of 15 g of the above phospholene oxide gives 8.5 g of a tetrahydrofuran insoluble fraction and 5.5 g of a tetrahydrofuran-soluble fraction. Both fractions contain C, H and P in the mole ratio 10:11:1 with a phosphorus content of 17%. The THF-insoluble polymer softens at ca. 260°–270 °C and as shown by thermogravimetric analysis is stable at temperatures in excess of 300°C. Gel permeation chromatography indicates a molecular weight range from 2,000–16,000 with a weight average molecular weight Mw = 4,300. The THF-soluble fraction consists of products having a molecular weight range from 350–2,000.

The resultant phosphorus-containing polymer when tested as a fire retardant additive (10% by weight additive which is about 1.7 wt% P in the total mixture) in polyethylene terephthalate or nylon 6,6 by the procedure described in Example 1 causes the oxygen index of each sample to change from about 20 to 25–26.

EXAMPLE 3

Using the procedure of Example 1 but substituting isoprene for butadiene, 1,3-dimethyl-3-phospholene-1-oxide is prepared and polymerized by the method of Example 1. The resulting polymer, having a phosphorus content of 25% when incorporated as an additive in (a) polyester (b) nylon (c) polyacrylonitrile (d) polyvinyl chloride, and (e) polystyrene imparts flame retardant properties to the said polymers.

EXAMPLE 4

Using the procedure of Example 2 (but substituting isoprene for butadiene), 3-methyl-1-phenyl-2-phospholene-1-oxide is prepared and polymerized by the method of Example 1. The resulting polymer, having a phosphorus content of 16%, is stable at temperatures in excess of 300°C and when tested as flame retardant as described in Example 1 causes the oxygen index of polyethylene terephthalate or nylon-6,6 to change from 20 to 25–26.

EXAMPLE 5

Using the procedure of example 1 with n-hexylphosphonous dichloride and butadiene as reactants 1-n-hexyl-3-phospholene-1-oxide is prepared and polymerized by the method of Example 1. The resulting polymer, having a phosphorus content of 16.5% when incorporated as an additive in polyester or nylon imparts flame retardant properties.

EXAMPLE 6

Following the procedure of Example 1 with n-octylphosphonous dichloride and butadiene as the reactants 1-n-octyl-3-phospholene-1-oxide is prepared and polymerized by the method of Example 1. The resulting polymer, having a phosphorus content of 14.4% when incorporated as an additive in polyester or nylon imparts flame retardant properties.

EXAMPLE 7

Following the procedure of Example 1 with n-decylphosphonous dichloride and butadiene as the reactants 1-n-decyl-3-phospholene-1-oxide is prepared and polymerized by the method of Example 1. The resulting polymer, having a phosphorus content of 12.5%, when incorporated as an additive in polyester or nylon imparts flame retardant properties.

EXAMPLE 8

Following the procedure of Example 1 with n-dodecylphosphonous dichloride and butadiene as reactants 1-n-dodecyl-3-phospholene-1-oxide is prepared and polymerized by the method of Example 1. The resulting polymer, having a phosphorus content of 11.4% when incorporated as an additive in polyester or nylon imparts flame retardant properties.

EXAMPLE 9

Following the procedure of Example 2 with α-naphthyl phosphonous dibromide and butadiene as reactants 1-α-naphthyl-2-phospholene-1-oxide is prepared and polymerized by the method of Example 1. The resulting polymer, having a phosphorus content of 13.5%, when incorporated as an additive in polyester or nylon imparts flame retardant properties.

EXAMPLE 10

Samples of 1-methyl-3-phospholene-1-oxide, prepared as described in Example 1, and 1-phenyl-2-phospholene-1-oxide, prepared as described in Example 2 in the mole ratio 3:1 are dissolved in dry tetrahydrofuran and polymerized by the procedure of Example 1. The resulting compolymer, having a phosphorus content of 22%, when incorporated as additives in polyethylene terephthalate or nylon imparts flame retardant properties.

EXAMPLE 11

A quantity of 1 g of cupric stearate, 116 (0.89 mole) of freshly distilled ethylphophonous dichloride and 191 g (3.53 mole) of butadiene are charged into a glass reactor. The mixture is stirred at room temperature for 4 weeks. The reaction product is worked up as described in Example 1 and 98g (0.75 mole) of 1-ethyl-3-phospholene-1-oxide was obtained, yield 85%, b.p. 85° at 1 mm pressure. Homopolymerization of this material is effected by the procedure of Example 1. A quantity of 2.9 g of the above phospholene oxide gives 0.9 g of a tetrahydrofuran-insoluble fraction and 2.0 g of a tetrahydrofuran-soluble fraction. Both fractions contain C:H:P in the mole ratio 6:11:1 with a phosphorus content of 23.5%. The THF-insoluble polymer softens at ca. 180° and as shown by thermogravimetric analysis is stable at temperatures in excess of 300°C. Gel permeation chromatography indicates a molecular weight range from 2,000–20,000. The THF-soluble fraction consists of products having a molecular weight range from 350–2,000.

The resultant phosphorus polymer when tested as a fire retardant additive (10% by weight) in polyethylene terephthalate or nylon 6,6 by the procedure described in Example 1 causes the oxygen index of each sample to change from about 20 to 27–28.

EXAMPLE 12

Using the procedure of Example 1 but substituting dimethyl butadiene for butadiene 1,3,4-trimethyl-3-phospholene-1-oxide is prepared and polymerized by the method of Example 1. The resulting polymer, having a phosphorus content of 21.5%, when incorporated as an additive in polyester or nylon imparts flame retardant properties.

EXAMPLE 13

Samples of one part of 1-methyl-3-phospholene-1-oxide and 9 parts of acrylonitrile are copolymerized by the general procedure of Example 1. The resulting copolymer, having a phosphorus content of 2.6%, has flame retardant properties.

EXAMPLE 14

Samples of one part of 1-phenyl-2-phospholene-1-oxide and 9 parts vinylchloride are dissolved in a suitable solvent and copolymerized by the general procedure of Example 1. The resulting copolymer, having a phosphorus content of 1.7%, has flame retardant properties.

What is claimed is:

1. A composition of matter consisting essentially of a polymer of the class consisting of polyhexamethylene adipamide, poly-epsilon caproamides, polyhexamethylene sebacamide, polyethylene terephthalate, acrylonitrile, styrene, butadiene-styrene, vinylchloride, vinylidene chloride, vinyl acetate and isobutylene having incorporated therewith a phospholene oxide polymer characterized by the repeating units

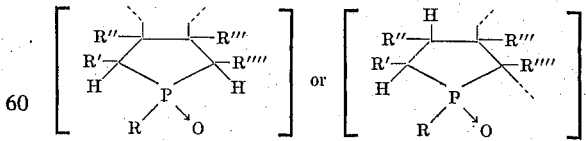

in which R is hydrocarbyl of 1–20 carbon atoms and R′, R″, R‴, R″″ are hydrogen or hydrocarbyl groups of 1–20 carbon atoms with the said phospholene oxide polymer having a molecular weight ranging from 200 to 1 million.

2. A composition of matter consisting essentially of a polymer of the class consisting of polyhexamethylene adipamide, poly-epsilon caproamides, polyhexamethylene sebacamide, polyethylene terephthalate, acrylonitrile, styrene, butadiene-styrene, vinylchloride, vinylidene chloride, vinyl acetate and isobutylene having incorporated therewith a phospholene oxide polymer characterized by the repeating units

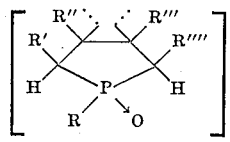

in which R is hydrocarbyl at 1–20 carbon atoms and R′, R″, R‴ R⁗ are hydrogen or hydrocarbyl groups of 1–20 carbon atoms with the said phospholene oxide polymer having a molecular weight of 200 to 1 million.

3. A composition of matter consisting essentially of a polymer of the class consisting of polyhexamethylene adipamide, poly-epsilon caproamides, polyhexamethylene sebacamide, polyethylene terephthalate, acrylonitrile, styrene, butadiene-styrene, vinylchloride, vinylidene chloride, vinyl acetate and isobutylene having incorporated therewith a phospholene oxide polymer characterized by the repeating units

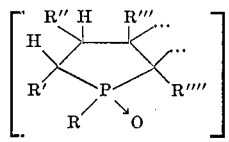

in which R is hydrocarbyl of 1–10 carbon atoms and R′, R″, R‴, R⁗ are hydrogen or hydrocarbyl groups of 1–20 carbon atoms with the said phospholene oxide polymer having a molecular weight of 200 to 1 million.

4. A composition of matter as in claim 1 in which the organic polymer is polyethylene terephthalate and in which the R′, R″, R‴ and R⁗ are H and R is a hydrocarbyl group of 1–20 carbon atoms.

5. A composition of matter as in claim 1 in which the organic polymer is polyethylene terephthalate and in which the R′ and R″ and R⁗ are H and R‴ is methyl and R is a hydrocarbyl group of 1–20 carbon atoms.

6. Process for modifying the properties of organic polymers of the class consisting of polyhexamethylene adipamide, poly-epsilon caproamides, polyhexamethylene sebacamide, polyethylene terephthalate, acrylonitrile, styrene, butadiene-styrene, vinyl chloride, vinylidene chloride, vinyl acetate and isobutylene which comprises incorporating therewith a phospholene oxide polymer characterized by the repeating units

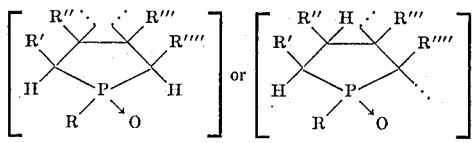

in which R is hydrocarbyl of 1–20 carbon atoms and R′, R″, R‴, R⁗ are hydrogen or hydrocarbyl groups of 1–20 carbon atoms with the said phospholene oxide polymer having a molecular weight ranging from 200 to 1 million.

* * * * *